UNITED STATES PATENT OFFICE.

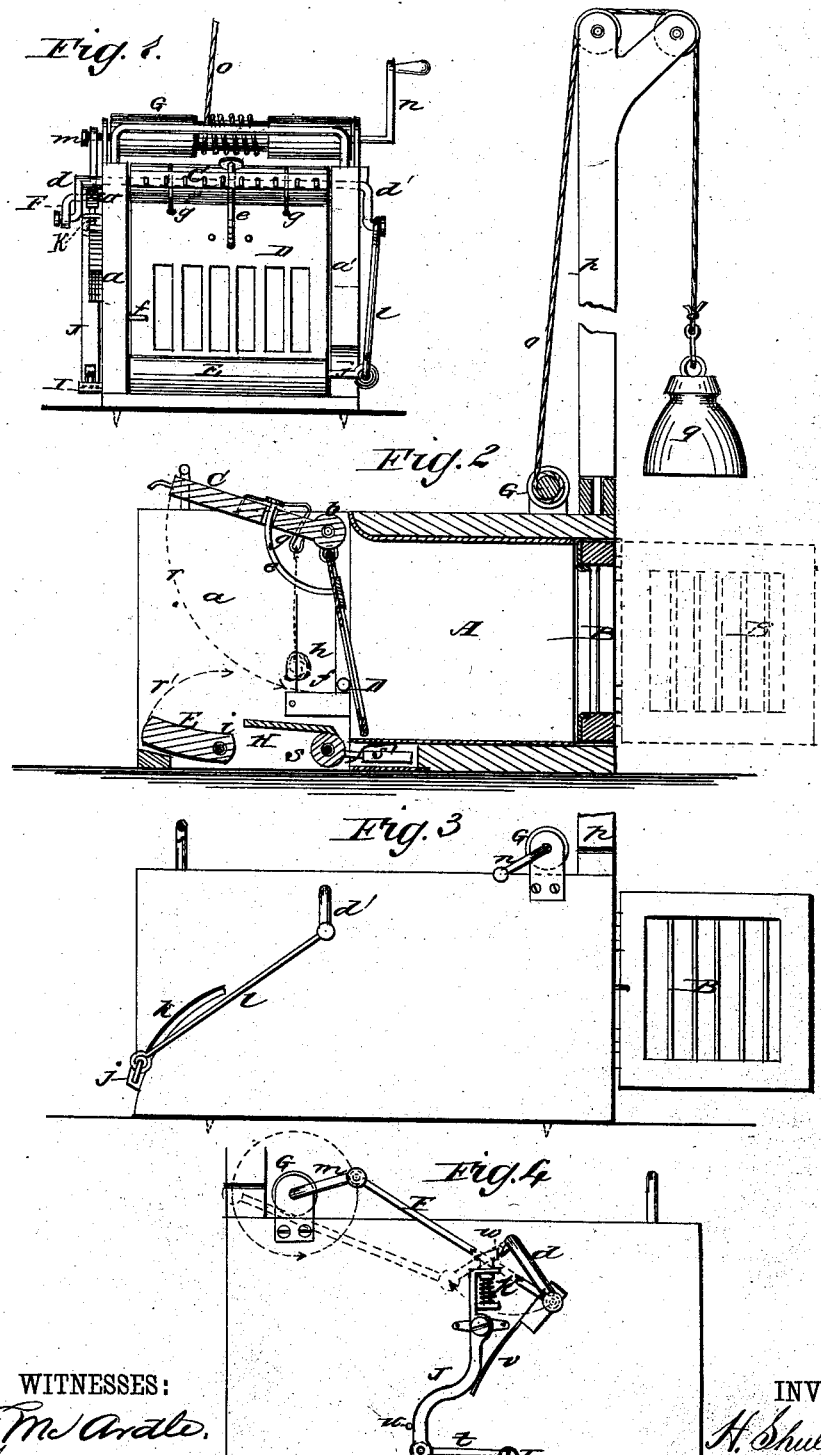

HENRY SHULENBARGER, OF SMITHVILLE, OHIO.

ANIMAL-TRAP.

SPECIFICATION forming part of Letters Patent No. 224,235, dated February 3, 1880.

Application filed October 1, 1879.

*To all whom it may concern:*

Be it known that I, HENRY SHULENBARGER, of Smithville, in the county of Wayne and State of Ohio, have invented a new and Improved Animal-Trap, of which the following is a specification.

The object of my invention is to provide a trap that will catch the animal before it has an opportunity to eat the bait, and will also set itself automatically after being sprung.

It consists of two conductors or sweeps pivoted at the entrance of the trap and in front of the door, said sweeps or conductors being operated by a weight controlled by a trigger held by a treadle between the lower sweep and the trap-door, so that as the animal enters to reach the bait suspended from the inside of the upper conductor he bears on the treadle, releases the trigger, and, the weight throwing the conductors inward, the animal is swept through the door, which is immediately closed by the backward movements of the conductors, which are again set by the treadle catching the trigger.

In the accompanying drawings, Figure 1 is a front elevation of my improved animal-trap. Fig. 2 is a vertical longitudinal section of the same. Figs. 3 and 4 are side elevations of the trap.

Similar letters of reference indicate corresponding parts.

Referring to the drawings, A is a rectangular box, having at one end a barred door, B. At the opposite end the sides $a\ a'$ are projected beyond the bottom and top of the box.

C is a vibrating door placed between sides $a\ a'$, with its rear end secured to a pintle, $b$, boxed in the sides in the upper part close to the end of the top of the box. The pintle projects through the sides, and the projecting ends are formed into cranks $d\ d'$.

Just under the pintle $b$ a barred door, D, is hinged to the end of the vibrating door. A curved rod, $e$, has one end attached to the barred door and the other carried up through a hole in the vibrating door and provided with a button, so that when the vibrating door is raised up it draws the barred door down until stopped by the stop $f$ projecting from the sides.

Near the pivoted end of the vibrating door hooks $g$ depend from its under side, to which the bait $h$ is hung, as shown in Fig. 2. In the free edge of the door is a line of spikes.

On a level with the bottom of the box is placed another vibrating door, E, held by its inner edge on a pintle, $i$, boxed in the sides $a\ a'$. To one end of this door, near the free edge, is fixed a rod, $j$, which projects through a curved slot, $k$, in the adjacent side, and is hinged to the end of a connecting-rod, $l$, the opposite end whereof is joined to the crank $d'$.

A connecting-rod, F, is joined to crank $d$ on the end of pintle $b$ opposite crank $d'$, and the opposite end of this rod is pivoted to the crank $m$ on the shaft of the windlass G, and the opposite end of the windlass-shaft is provided with a winch, $n$. A rope, $o$, runs from the windlass over pulleys on the upper end of standard $p$, and to the end of the rope is hung a heavy weight, $q$.

By the turning of crank $m$ in the dotted circle, Fig. 4, the crank $d$ is oscillated through the arc indicated by the dotted lines in the same figure, and the door C vibrated through an arc indicated by the dotted line $r$, Fig. 2, while door E is vibrated in the arc of the dotted line $r'$, both closing together toward the barred door D, and opening outward, one up and the other down, so as to leave the entrance to the door D unobstructed. This door, when the vibrating door C moves downward, is thrown open by moving backward and upward, and when the vibrating door opens it draws the barred door closed, as shown in Fig. 2.

This movement of doors C and E is produced by the gravitation of the weight $q$ when the cord is wound on the windlass G, and it is regulated to limit the number of vibrations by a device which I will now describe. Between vibrating door E and the bottom of the trap is a treadle, H, hinged by its rear edge to a pintle, $s$, boxed in the sides $a\ a'$, and held in a horizontal position by a spring, $s'$, the end of which on side $a$ extends through the side, and is provided with a stop, I. Above this a lever, J, is fulcrumed in the side of the box, having its lower end bent backward and carrying on its extremity a pawl, $t$, held in a horizontal position to engage the stop I, but adapted to be swung up so as to be disengaged from the stop. Back of this part of the lever is a stop, $u$, to limit the backward swing of the lever, a spring, $v$, bearing against its edge tending to throw it back.

K is a vertically-moving spring-bolt projecting through the upper end of the lever.

On the pintle $b$, between the crank $d$ and the side $a$, is a projection, $w$, in position to bear against the bolt K when the lever is held by the stop I in the position indicated in Fig. 4; but when the treadle is moved down by an animal stepping upon it the stop is turned so as to disengage the pawl, and the strain of the weight exerted through windlass G, crank $m$, rod F, crank $d$, and projection $w$ on the bolt K throws the upper end of the lever back. The projection $w$ being thus released, crank $d$, and with it doors C E, is oscillated in the direction of the dotted arrow, Fig. 4, and when it moves back (the lever having been thrown into position again by the spring $v$ with the pawl held by the stop) the projection $w$ strikes the inclined face of the spring-bolt K, forcing it down out of the way, and, passing back of the same, is held as in Fig. 4, while the vibrating doors C E are held open, as in Fig. 2.

The operation of the trap is as follows: The weight is wound up to its highest point, and the vibrating doors, which I call "conductors," set themselves in the open position shown in Fig. 2. An animal entering the trap to get at the bait $h$ steps upon the treadle H and immediately trips the trigger, setting the weight in motion, the conductors vibrate toward the barred door D, open the same, and at the same time, striking the animal, force it through the opening made by the backward and upward swing of the door D into the box A, the conductors instantly moving back again, drawing barred door D closed, thus shutting the animal in the box A, and the trigger, catching projection $w$ in the manner described, holds the conductors C E open, and the trap is thus reset.

Thus it will be seen that the trap works automatically, forcing the animal into the box as soon as it bears upon the treadle and before it has an opportunity to swallow the bait, and then resetting itself and shutting the animal in the box. So long as the weight exerts any power this automatic movement can be kept up, and by adjusting the capacity of the box A to the size of animals to be caught, and then arranging the mechanism so as to set itself to catch a number equal to the capacity of the box, and no more, all danger of overcrowding will be avoided.

The button on the outer end of rod $e$ prevents the door D from being opened from within by the confined animals.

The conductors, it will be observed, when moving inward, are so close together as to prevent the animal from escaping through them.

The barred door B at the end of the trap gives entrance to the box A for removing the animals.

Having thus fully described my invention, I claim as new and desire to secure by Letters Patent—

1. The combination, with the door C, secured on a vibrating crank-pintle, $b$, of the barred door D, hinged to said door C and connected therewith by the button-rod $e$ passing through door C, and the door E, attached to a vibrating pintle connected with the crank-arm of pintle $b$, as shown and described.

2. The combination, with a weight and windlass mechanism, substantially as described, of the pintle $b$, having projection $w$, the treadle H on a vibrating spring-pintle, $s$, having extension with stop I, the spring-held lever J, carrying pawl $t$ and limited in its backward movement by a stop, $u$, and the vertically-movable spring-bolt K, as and for the purpose specified.

HENRY SHULENBARGER.

Witnesses:
WILLIAM L. HUTCHISON,
JOSHUA F. SHANK.